United States Patent
Miller

(10) Patent No.: US 10,155,471 B2
(45) Date of Patent: *Dec. 18, 2018

(54) HEADLIGHT SETTING ACTIVATION VIA A STALK SWITCH

(71) Applicant: Ford Global Technologies, LLC, Dearborn, MI (US)

(72) Inventor: Robert Miller, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/694,599

(22) Filed: Sep. 1, 2017

(65) Prior Publication Data

US 2018/0154821 A1 Jun. 7, 2018

Related U.S. Application Data

(63) Continuation of application No. 15/368,248, filed on Dec. 2, 2016, now Pat. No. 9,751,456.

(51) Int. Cl.
*B60Q 1/06* (2006.01)
*B60Q 1/14* (2006.01)
*B60Q 1/46* (2006.01)

(52) U.S. Cl.
CPC .......... *B60Q 1/1469* (2013.01); *B60Q 1/143* (2013.01); *B60Q 1/1423* (2013.01); *B60Q 1/46* (2013.01); *B60Q 2300/056* (2013.01); *B60Q 2300/42* (2013.01)

(58) Field of Classification Search
None
See application file for complete search history.

(56) References Cited

U.S. PATENT DOCUMENTS

| 975,146 A | 11/1910 | Manelius |
| 5,581,235 A | 12/1996 | Hollstein |
| 6,448,548 B1 | 9/2002 | Doczy et al. |
| 7,719,197 B2 * | 5/2010 | Martin ................. B60Q 1/1423 315/82 |
| 9,168,863 B2 | 10/2015 | Piersing et al. |

(Continued)

FOREIGN PATENT DOCUMENTS

| DE | 20302082 U1 | 7/2003 |
| GB | 2448181 A | 10/2008 |

(Continued)

OTHER PUBLICATIONS

Search Report dated May 15, 2018 for GB Patent Application No. GB 1719738.5 (3 Pages).

*Primary Examiner* — Dedei K Hammond
(74) *Attorney, Agent, or Firm* — James P. Muraff; Neal, Gerber & Eisenberg LLP

(57) ABSTRACT

Method, apparatus, and computer storage media are disclosed for headlight setting activation via a stalk switch. An example vehicle includes a stalk switch and a headlamp controller. The example headlamp controller is to monitor the stalk switch and detect, in response to identifying the stalk switch is transitioning to a high-beam position, a number of occurrences the stalk switch is set at the high-beam position in a predetermined time period. Also, the example headlamp controller is to activate, in response to determining the number of occurrences is two, a first headlight setting of headlamps.

18 Claims, 4 Drawing Sheets

(56) References Cited

U.S. PATENT DOCUMENTS

2008/0246404 A1* 10/2008 Shelton ............... B60Q 1/1423
                                                                                      315/82
2011/0316421 A1    12/2011  Fuentes

FOREIGN PATENT DOCUMENTS

| KR | 0149145 B1 | 10/1998 |
|---|---|---|
| WO | WO 9104171 A1 | 4/1991 |

* cited by examiner

HEADLIGHT SETTING ACTIVATION VIA A STALK SWITCH

CROSS-REFERENCE TO RELATED APPLICATION

This application is a continuation of U.S. patent application Ser. No. 15/368,248, filed on Dec. 2, 2016. The prior application is incorporated by reference in its entirety.

TECHNICAL FIELD

The present disclosure generally relates to headlight settings and, more specifically, headlight setting activation via a stalk switch.

BACKGROUND

Generally, vehicles include headlamps to illuminate areas in front of the vehicles. Typically, a vehicle includes low-beam headlamps that are utilized to illuminate a side of a road along which the vehicle is travelling. Additionally, a vehicle typically includes high-beam headlamps that are utilized to illuminate a greater portion of the road (e.g., illuminates the side of the road along which the vehicle travels and a side of the road along which on-coming traffic travels). Some vehicles utilize the headlamps to produce other lighting effects. For example, some emergency vehicles (e.g., police cars, ambulances, etc.) utilize the headlamps to produce wig-wag flashing to alert nearby drivers and/or pedestrians.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for high-beam setting activation via a headlight stalk switch. An example disclosed vehicle includes a stalk switch and a headlamp controller. The example headlamp controller is to monitor the stalk switch and detect, in response to identifying the stalk switch is transitioning to a high-beam position, a number of occurrences the stalk switch is set at the high-beam position in a predetermined time period. Also, the example headlamp controller is to activate, in response to determining the number of occurrences is two, a first headlight setting of headlamps.

An example disclosed method to activate a high-beam setting of a vehicle includes monitoring, via a headlamp controller, a stalk switch and detecting, in response to identifying the stalk switch is transitioning to a high-beam position, a number of occurrences the stalk switch is set at the high-beam position in a predetermined time period. The example disclosed method also includes activating, in response to determining the number of occurrences is two, a first headlight setting of headlamps.

An example disclosed tangible computer storage medium includes instructions, which, when executed, cause a machine to monitor, via a headlamp controller, a stalk switch and detect, in response to identifying the stalk switch is transitioning to a high-beam position, a number of occurrences the stalk switch is set at the high-beam position in a predetermined time period. The example instructions also cause the machine to activate, in response to determining the number of occurrences is two, a first headlight setting of headlamps.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
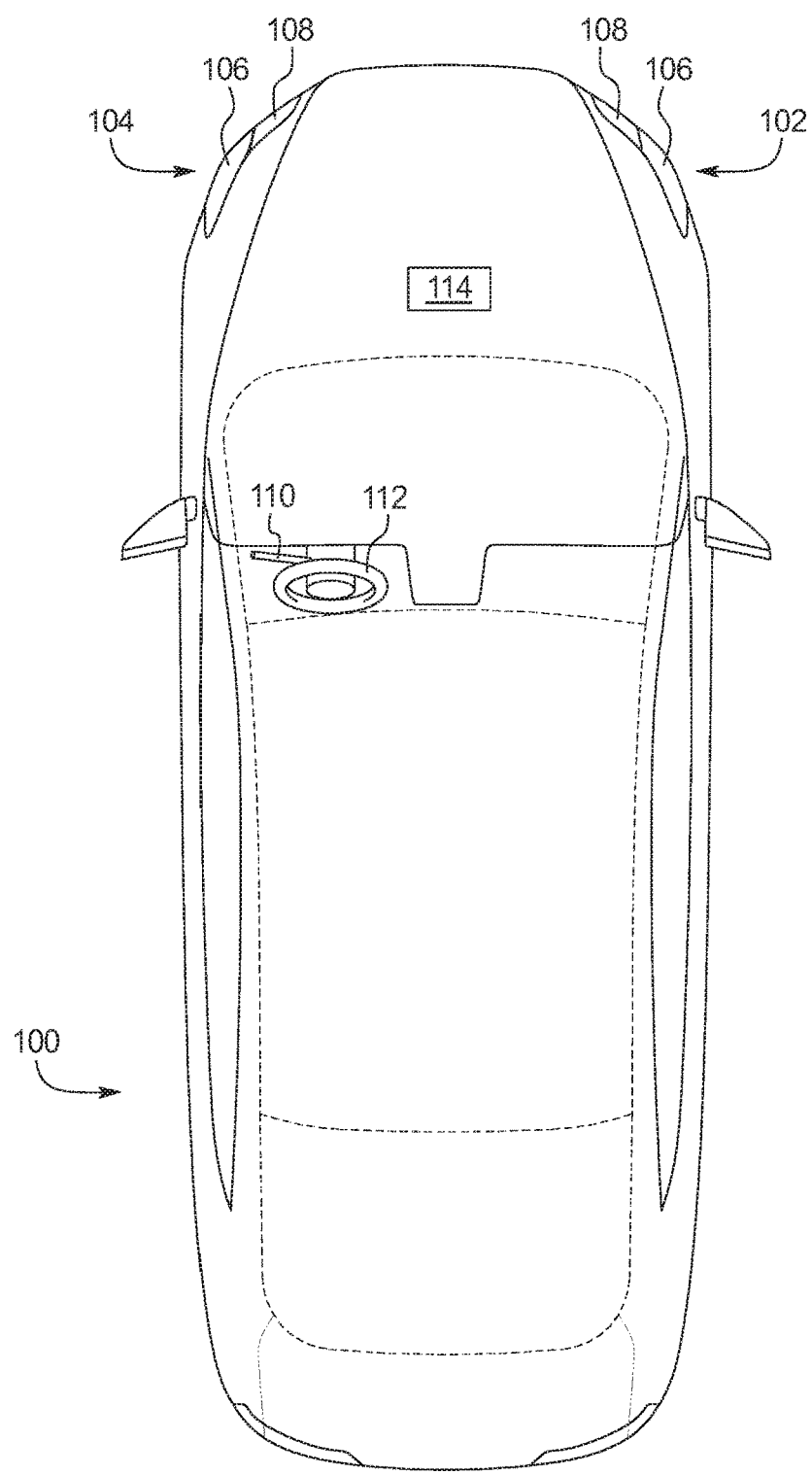
FIG. 1 illustrates a vehicle including an example headlamp controller in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Generally, vehicles include headlamps to illuminate areas in front of the vehicles. A vehicle typically includes low-beam headlamps that are directed to illuminate a side of a road along which the vehicle is travelling to avoid producing glare for oncoming traffic. Also, a vehicle typically includes high-beam headlamps that are utilized when the vehicle is isolated on the road to illuminate a greater portion of the road. For example, the high-beam lamps may illuminate the side of the road along which the vehicle travels and a side of the road dedicated for on-coming traffic. Some vehicles utilize the headlamps to produce other lighting effects (e.g., emergency flashers, wig-wag flashers, an anti-glare setting). For example, some emergency vehicles (e.g., police cars, ambulances, etc.) utilize the headlamps to produce wig-wag flashers in which headlamps illuminate in alternating manner to alert nearby drivers and/or pedestrians of an emergency situation.

Example apparatus, methods, and computer storage media disclosed herein utilize a stalk switch to activate and deactivate headlamp settings (e.g., a low-beam setting, a high-beam setting, a wig-wag setting, an anti-glare setting, etc.) of a vehicle. The vehicle includes a headlamp controller of a body control module communicatively coupled to the stalk switch (e.g., via wiring) that activates and deactivates the headlamp settings based on a position and/or movement of the stalk switch without utilizing additional controllers and/or wiring dedicated to respective headlamp settings.

An example vehicle disclosed herein includes a stalk switch and a headlamp controller that monitors the stalk switch. In response to identifying that the stalk switch is transitioning from a low-beam position to a high-beam position, the headlamp controller detects a number of occurrences the stalk switch is set at the high-beam position in a predetermined time period (e.g., 3 seconds). For example, the predetermined time period starts when the headlamp controller identifies that the stalk switch is transitioning to the high-beam position.

In response to determining that the number of occurrences is two, the headlamp controller activates a first headlight setting of the headlamps. That is, the headlamp controller activates the first headlight setting (e.g., a wig-wag setting) when a driver moves the stalk switch to the high-beam position, to a low-beam position, and back to the high-beam position within the predetermined time period. As used herein, a wig-wag setting is a headlamp setting of a vehicle in which a right headlamp and a left headlamp activate and deactivate in a predetermined pattern (e.g., an alternating pattern). High-beam lamps and/or low-beam lamps of the headlamps are activated during the wig-wag setting.

In some examples, the headlamp controller activates a high-beam setting in response to determining that the number of occurrences is one. That is, the headlamp controller activates the high-beam setting when the driver moves the stalk switch to the high-beam position and keeps the stalk switch in the high-beam position for the duration of the predetermined time period. As used herein, a high-beam setting is a headlamp setting of a vehicle in which high-beam lamps are activated to illuminate a greater portion of a road (e.g., a side of the road along which on-coming traffic travels) relative to a low-beam setting. Low-beam lamps may be activated or deactivated in the high-beam setting. As used herein, a low-beam setting is a headlamp setting of a vehicle in which low-beam lamps are activated and high-beam lamps are deactivated or dimmed to illuminate a side of a road along which the vehicle is travelling.

In some examples, the headlamp controller activates a second headlight setting in response to determining that the number of occurrences is three. That is, the headlamp controller activates the second headlight setting (e.g., an anti-glare setting) when the driver moves the stalk switch to the high-beam position, subsequently to the low-beam setting, back to the high-beam setting, back to the low-beam setting, and again back to the high-beam setting within the predetermined time period. As used herein, an anti-glare setting is a headlamp setting of a vehicle in which high-beam lamps are activated and a portion of the high-beam lamps are dimmed or reduced as on-coming traffic approaches the vehicle to reduce glare directed toward the on-coming traffic.

In some examples, the headlamp controller deactivates the first headlight setting, the second headlight setting, and/or the high-beam setting in response to detecting that the stalk switch has transitioned from the high-beam position after the predetermined time period has ended. In some such examples, the headlamp controller activates the low-beam setting upon detecting that the stalk switch has transitioned from the high-beam position to the low-beam position after the predetermined time period has ended.

Turning to the figures, FIG. 1 illustrates a vehicle 100 that activates and deactivates headlamp settings in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

As illustrated in FIG. 1, the vehicle 100 includes a right headlamp 102 and a left headlamp 104. Further, each of the headlamps 102, 104 includes a low-beam lamp 106 and a high-beam lamp 108. In some examples, the low-beam lamps 106 and the high-beam lamps 108 of the right headlamp 102 and the left headlamp 104 each include a plurality of light-emitting diodes (LEDs). The LEDs of each of the low-beam lamps 106 and the high-beam lamps 108 may be fully illuminated, fully dimmed, and/or partially illuminated. Additionally, illumination of the LEDs of the low-beam lamps 106 and the high-beam lamps 108 is adjustable so that the headlamps 102, 104 may produce a plurality of headlight settings for the vehicle 100. For example, the headlamps 102, 104 may produce a low-beam setting when the low-beam lamps 106 are fully illuminated and the high-beam lamps 108 are fully dimmed. The headlamps 102, 104 may produce a high-beam setting when the high-beam lamps 108 are fully illuminated. Additionally, to produce an anti-glare setting, at least a portion of the LEDs of one or more of the low-beam lamps 106 and the high-beam lamps 108 dim as another vehicle approaches the vehicle 100 and illuminate as the other vehicle moves away from the vehicle 100.

The vehicle 100 of the illustrated example includes a stalk switch 110 that is located adjacent to a steering wheel 112 to enable a driver to activate, deactivate, and/or change a headlight setting of the headlamps 102, 104. For example, the driver may move the stalk switch 110 between a low-beam position and a high-beam position. In the illustrated example, the stalk switch 110 is communicatively coupled to a headlamp controller 114 that controls operation of the headlamps 102, 104.

In operation, the headlamp controller 114 monitors the position of the stalk switch 110. When the headlamp controller 114 identifies that the stalk switch 110 is transitioning to the high-beam position (from the low-beam position), the headlamp controller 114 starts or triggers a predetermined time period (e.g., 1.5 second, 3 seconds, 5 seconds, etc.) during which the position of the stalk switch 110 is monitored. In some examples, the predetermined time period may vary based on a make, model, and/or feature content of the vehicle 100. Additionally or alternatively, a user (e.g., the driver) and/or a technician may adjust the predetermined time period. During the predetermined time period, the headlamp controller 114 detects a number of occurrences that the stalk switch 110 is set at the high-beam position. The headlamp controller 114 activates or adjusts a headlight setting of the vehicle 100 based on the number of occurrences that the stalk switch 110 is set to the high-beam position during the predetermined time period. For example, the headlamp controller 114 activates a the high-beam setting when the number of detected occurrences is one, a first headlamp setting (e.g., a wig-wag setting) when the number of detected occurrences is two, a second headlamp setting (e.g., the anti-glare setting) when the number of detected occurrences is three, etc. Alternatively, the headlamp controller 114 may activate or adjust a headlight setting of the vehicle 100 based on the number of occurrences that the stalk switch 110 is set to the low-beam position and/or any other position of the stalk switch 110. Further, the headlamp controller 114 of the illustrated example deactivates the activated headlamp setting when the stalk switch 110 is moved away from the high-beam position after the predetermined time period has ended. For example, the headlamp controller 114 activates the low-beam setting when the stalk switch is moved to the low-beam position after the predetermined time period has ended.

Figure 2A:
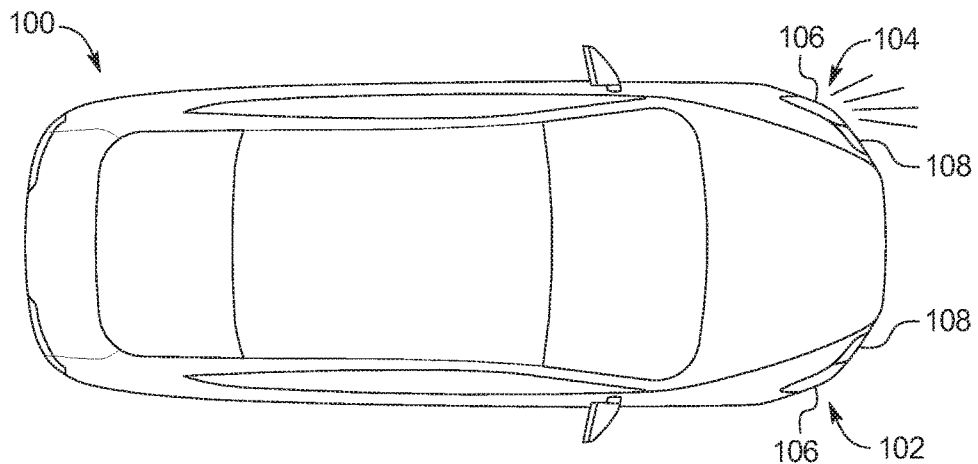
FIGS. 2A-2C depict a lighting sequence of a wig-wag setting activated by the headlamp controller of FIG. 1.
Figure 2B:
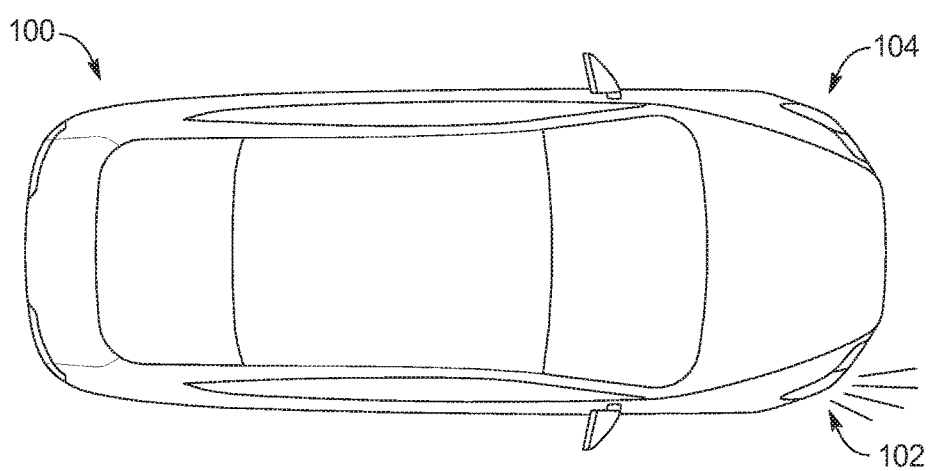
Figure 2C:
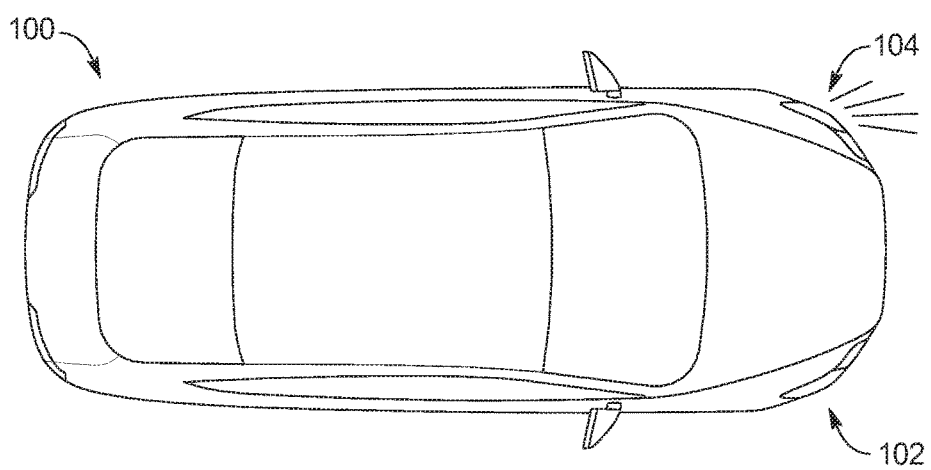

FIGS. 2A-2C depict a lighting sequence of the wig-wag setting that is activated by the headlamp controller 114. Initially, as illustrated in FIG. 2A, the low-beam lamp 106 and/or the high-beam lamp 108 of the left headlamp 104 is illuminated and the low-beam lamp 106 and/or the high-beam lamp 108 of the right headlamp 102 is dimmed. Subsequently, as illustrated in FIG. 2B, the left headlamp 104 is dimmed and the right headlamp 102 is illuminated. As illustrated in FIG. 2C, illumination of the right headlamp 102 and the left headlamp 104 alternates again such that the left headlamp 104 is illuminated and the right headlamp 102 is dimmed. The alternating illumination of the right headlamp 102 and the left headlamp 104 continues until the headlamp controller 114 deactivates the wig-wag setting. For example, the headlamp controller 114 deactivates the wig-wag setting in response to the driver transitioning the stalk switch 110 from the high-beam position to the low-beam position.

Figure 3:
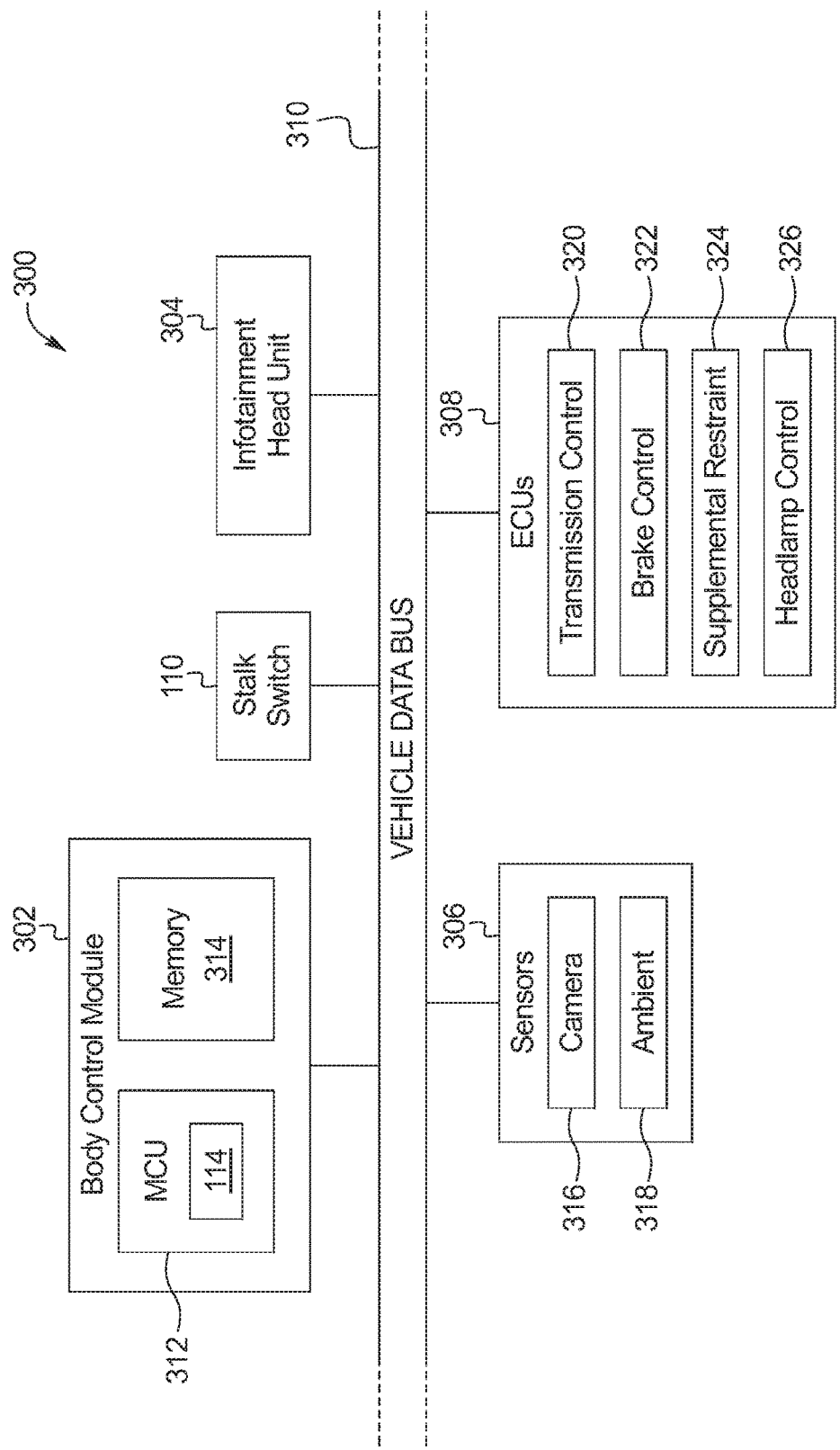
FIG. 3 is a block diagram of electronic components of the vehicle of FIG. 1.

FIG. 3 is a block diagram of electronic components 300 of the vehicle 100. As illustrated in FIG. 3, the electronic components 300 include a body control module 302, the stalk switch 110, an infotainment head unit 304, sensors 306, electronic control units (ECUs) 308, and a vehicle data bus 310.

The body control module 302 controls one or more subsystems throughout the vehicle 100, such as external lighting, power windows, power locks, an immobilizer system, power mirrors, etc. For example, the body control module 302 includes circuits that drive one or more of relays (e.g., to control wiper fluid, etc.), brushed direct current (DC) motors (e.g., to control power seats, power locks, power windows, wipers, etc.), stepper motors, LEDs (e.g., to illuminate the low-beam lamp 106 and/or the high-beam lamp 108 of the right headlamp 102 and/or the left headlamp 104), etc.

The body control module 302 includes a microcontroller unit, controller or processor 312 and memory 314. In some examples, the body control module 302 is structured to include the headlamp controller 114. Alternatively, in some examples, the headlamp controller 114 is incorporated into another electronic control unit (ECU) with its own processor 312 and memory 314. The processor 312 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 314 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 314 includes multiple kinds of memory, particularly volatile memory and non-volatile memory.

The memory 314 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 314, the computer readable medium, and/or within the processor 312 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 304 provides an interface between the vehicle 100 and a user. For example, the infotainment head unit 304 displays the headlight setting of the headlamps 102, 104 of the vehicle 100. More generally, the infotainment head unit 304 includes digital and/or analog interfaces (e.g., input devices and output devices) to receive input from and display information for the user(s). The input devices include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. For example, the infotainment head unit 304 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 304 may display the infotainment system on, for example, the center console display.

The sensors 306 are arranged in and around the vehicle 100 to monitor properties of the vehicle 100 and/or an environment in which the vehicle 100 is located. One or more of the sensors 306 may be mounted to measure properties around an exterior of the vehicle 100. Additionally or alternatively, one or more of the sensors 306 may be mounted inside a cabin of the vehicle 100 or in a body of the vehicle 100 (e.g., an engine compartment, wheel wells, etc.) to measure properties in an interior of the vehicle 100. For example, the sensors 306 include accelerometers, odometers, tachometers, pitch and yaw sensors, wheel speed sensors, microphones, tire pressure sensors, biometric sensors and/or sensors of any other suitable type. In the illustrated example, the sensors 306 include a camera 316 and an ambient light sensor 318 that may measure ambient light of the vehicle 100. The headlamp controller 114 may utilize the ambient light data collected by the camera 316 and/or the ambient light sensor 318 to adjust a brightness of the low-beam lamp 106 and/or the high-beam lamp 108 of the right headlamp 102 and/or the left headlamp 104. Additionally or alternatively, the camera 316 or another sensor may detect another vehicle approaching the vehicle 100 to adjust illumination of one or more of the low-beam lamps 106 and the high-beam lamps 108 when the headlamp controller 114 has activated the anti-glare setting.

The ECUs 308 monitor and control the subsystems of the vehicle 100. For example, the ECUs 308 are discrete sets of electronics that include their own circuit(s) (e.g., integrated circuits, microprocessors, memory, storage, etc.) and firmware, sensors, actuators, and/or mounting hardware. The ECUs 308 communicate and exchange information via a vehicle data bus (e.g., the vehicle data bus 310). Additionally, the ECUs 308 may communicate properties (e.g., status of the ECUs 308, sensor readings, control state, error and diagnostic codes, etc.) to and/or receive requests from each other. For example, the vehicle 100 may have seventy or more of the ECUs 308 that are positioned in various locations around the vehicle 100 and are communicatively coupled by the vehicle data bus 310. In the illustrated example, the ECUs 308 include a transmission control module 320, a brake control module 322, a supplemental restraint system 324, and a headlamp control module 326. For example, the transmission control module monitors and controls a transmission of the vehicle 100, the brake control module 322 controls brakes of the vehicle 100 based on data collected by the sensors 306, and the supplemental restraint system 324 (also known as a passive restraint system or an airbag system) controls deployment of airbags of the vehicle 100. Further, the headlamp control module 326 activates and/or deactivates headlamps of the vehicle (e.g., the right headlamp 102, the left headlamp 104, the low-beam lamps 106, and/or the high-beam lamps 108) based on signals and/or instructions received by the headlamp controller 114 of the body control module 302. In other examples, the headlamp control module 326 includes the headlamp controller 114 that determines when to activate and/or deactivate the headlamps of the vehicle 100.

The vehicle data bus 310 communicatively couples the stalk switch 110, the body control module 302, the infotainment head unit 304, the sensors 306, and the ECUs 308 of the vehicle 100. In some examples, the vehicle data bus 310 includes one or more data buses. The vehicle data bus 310 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
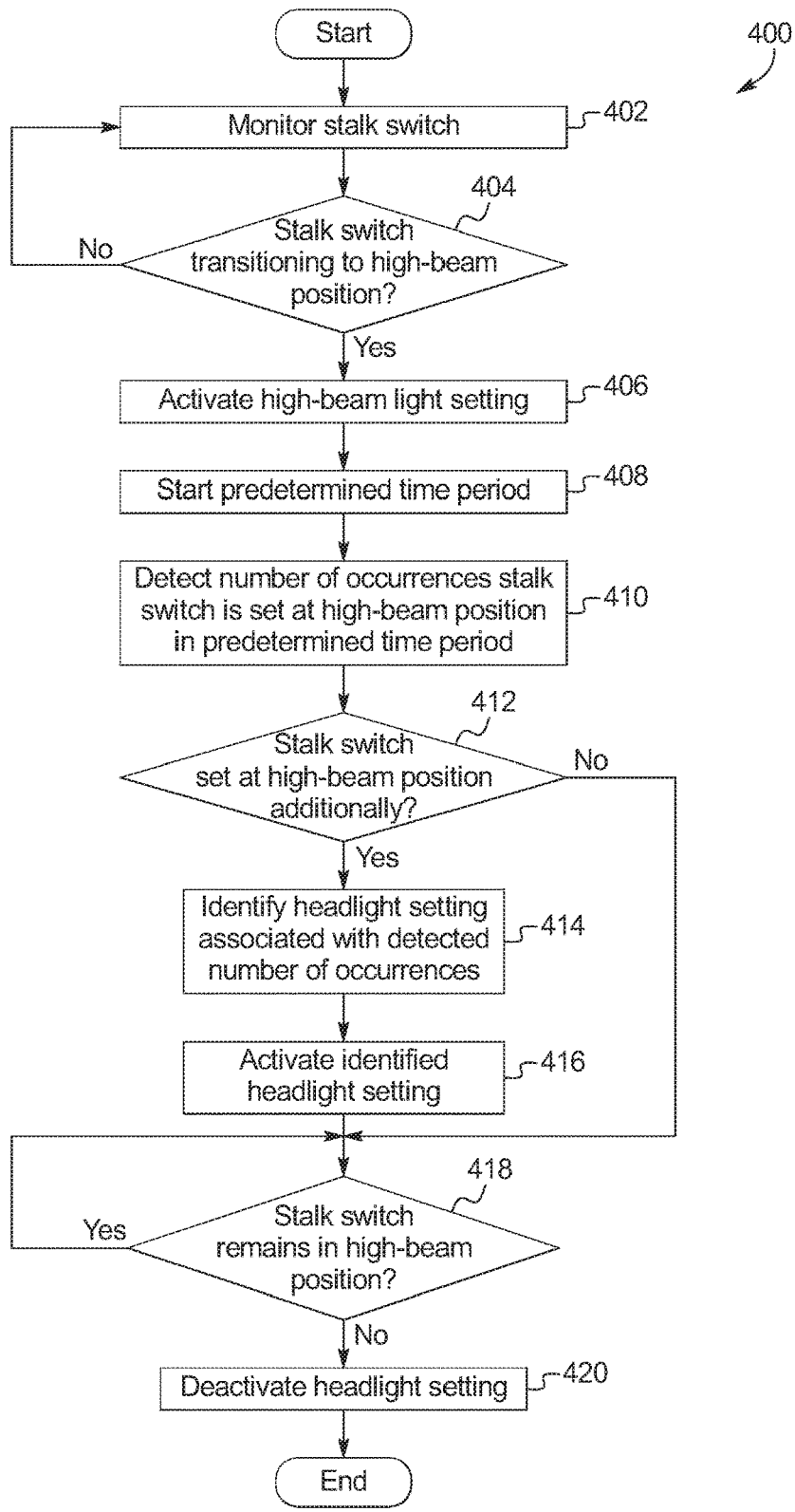
FIG. 4 is a flowchart of an example method to activate a headlight setting via a stalk switch of the vehicle of FIG. 1.

FIG. 4 is a flowchart of an example method 400 to activate and deactivate a headlight setting of vehicle headlamps. The flowchart of FIG. 4 is representative of machine readable instructions that are stored in memory (such as the memory 314 of FIG. 3) and include one or more programs which, when executed by a processor (such as the processor 312 of FIG. 3), cause the vehicle 100 to implement the example headlamp controller 114 of FIGS. 1 and 3. While the example program(s) is/are described with reference to the flowchart illustrated in FIG. 4, many other methods of implementing the example headlamp controller 114 may alternatively be used. For example, the order of execution of the blocks may be rearranged, changed, eliminated, and/or combined to perform the method 400. Further, because the method 400 is disclosed in connection with the components of FIGS. 1-3, some functions of those components will not be described in detail below.

Initially, at block 402, the headlamp controller 114 monitors the stalk switch 110. At block 404, the headlamp controller 114 identifies whether the stalk switch 110 is transitioning to a high-beam position. If the headlamp controller 114 does not identify that the stalk switch 110 is transitioning to a high-beam position, the method 400 returns to block 404. Otherwise, upon identifying that the stalk switch 110 is transitioning to a high-beam position, the method 400 proceeds to block 406 at which the headlamp controller 114 activates a high-beam light setting.

At block 408, upon the headlamp controller 114 determining that the stalk switch 110 has transitioned to the high-beam position, the headlamp controller 114 starts or triggers a predetermined time period during which a position of the stalk switch 110 is monitored. In some examples, the predetermined time period is adjustable by a user and/or a technician. Additionally or alternatively, the predetermined time period may vary based on a make and/or model of the vehicle 100. In other examples, the headlamp controller 114 starts or triggers the predetermined time period during which the position of the stalk switch 110 is monitored upon determining that the stalk switch 110 has transitioned from the high-beam position.

At block 412, the headlamp controller 114 detects a number of occurrences the stalk switch 110 is set at the high-beam position during the predetermined time period. After the predetermined time period has ended, the method 400 continues to block 412 at which the headlamp controller 114 determines whether the stalk switch 110 was set at the high-beam additionally during the predetermined time period.

In response to detecting that there was an additional occurrence of the stalk switch 110 being set at the high-beam position during the predetermined time period, the method 400 proceeds to block 414 at which the headlamp controller 114 identifies a light setting associated with the detected number of occurrences the stalk switch 110 is set to the high-beam position during the predetermined time period. At block 416, the headlamp controller 114 activates the identified light setting. For example, if the headlamp controller 114 detects at block 410 that the stalk switch 110 was set at the high-beam position two times during the predetermined time period, the headlamp controller 114 identifies a first headlight setting (e.g., a wig-wag setting) at block 414 and activates the first headlight setting at block 416. Alternatively, if the headlamp controller 114 detects at block 408 that the stalk switch 110 was set at the high-beam position three times during the predetermined time period, the headlamp controller 114 identifies a second headlight setting (e.g., an anti-glare setting) at block 414 and activates the second headlight setting at block 416.

Upon activating the setting at block 416 or upon detecting at block 412 that there was not an additional occurrence of the stalk switch 110 being set at the high-beam position, the method 400 proceeds to block 418 at which the headlamp controller 114 determines whether the stalk switch 110 remains in the high-beam position. The method 400 remains at block 418 if the headlamp controller 114 determines that the stalk switch 110 has remained in the high-beam position. Otherwise, if the headlamp controller 114 determines that the stalk switch 110 has transitioned from the high-beam position, the method 400 proceeds to block 420 at which the headlamp controller 114 deactivates the setting activated at block 408 or block 416 (e.g., the high-beam light setting, the first light setting, the second light setting, etc.). In some examples, the headlamp controller 114 activates a low-beam setting upon detecting that the stalk switch 110 has transitioned from the high-beam position to a low beam position.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

The invention claimed is:

1. A vehicle comprising:
a headlamp switch; and
a headlamp controller to:
monitor the headlamp switch;
detect a number of occurrences the headlamp switch is set at a high-beam position in a predetermined time period; and
activate different headlight settings of head lamps based on the number of occurrences when the number of occurrences is at least two.

2. The vehicle of claim 1, wherein when the number of occurrences is two, the headlamp controller is to activate a first headlight setting of the headlamps.

3. The vehicle of claim 2, wherein the first headlight setting is a wig-wag setting.

4. The vehicle of claim 3, wherein when in the wig-wag setting, the headlamp controller is to:
alternate a first one of the headlamps between a high-beam setting and a low-beam setting; and
alternate a second one of the headlamps between the high-beam setting and the low-beam setting opposite of the first one of the headlamps.

5. The vehicle of claim 2, wherein the headlamp controller deactivates the first headlight setting in response to detecting the headlamp switch transitioning from the high-beam position after the predetermined time period has ended.

6. The vehicle of claim 1, wherein when the number of occurrences is three, the headlamp controller activates a second headlight setting of the headlamps.

7. The vehicle of claim 6, wherein the second headlight setting is an anti-glare setting.

8. The vehicle of claim 1, wherein the predetermined time period starts when the headlamp controller identifies that the headlamp switch transitions to the high-beam position.

9. The vehicle of claim 1, wherein the predetermined time period is at least three seconds.

10. A method to select different headlight settings of a vehicle, the method comprising:
monitoring, via a headlamp controller, a headlamp switch;
detecting a number of occurrences the headlamp switch is set at a high-beam position in a predetermined time period; and
activating the different headlight settings of headlamps based on the number of occurrences when the number of occurrences is at least two.

11. The method of claim 10, including activating a first headlight setting of the headlamps when the number of occurrences is two.

12. The method of claim 11, wherein the first headlight setting is a wig-wag setting.

13. The method of claim 12, including when in the wig-wag setting:
alternating a first one of the headlamps between a high beam setting and a low beam setting; and
alternating a second one of the headlamps between the high beam setting and the low beam setting opposite of the first one of the headlamps.

14. The method of claim 11, including deactivating the first headlight setting in response to detecting the headlamp switch transitioning from the high-beam position after the predetermined time period has ended.

15. The method of claim 10, including when the number of occurrences is three, activating a second headlight setting of the headlamps.

16. The method of claim 15, wherein the second headlight setting is an anti-glare setting.

17. The method of claim 10, wherein starting the predetermined time period when the headlamp controller identifies that the headlamp switch transitions to the high-beam position.

18. The method of claim 10, wherein the predetermined time period is at least three seconds.

* * * * *